United States Patent
Malone et al.

[11] Patent Number: 6,110,239
[45] Date of Patent: Aug. 29, 2000

[54] MOLTEN METAL HYDROCARBON GASIFICATION PROCESS

[75] Inventors: Donald P Malone, Grayson, Ky.; Thomas C Holcombe, Somerville, N.J.; Charles B Miller, Ashland, Ky.

[73] Assignee: Marathon Ashland Petroleum LLC

[21] Appl. No.: 08/867,703

[22] Filed: May 30, 1997

Related U.S. Application Data

[60] Provisional application No. 60/018,745, May 31, 1996, and provisional application No. 60/018,890, May 31, 1996.

[51] Int. Cl.$^7$ ................................................ C01B 3/24
[52] U.S. Cl. .................................... 48/198.2; 48/92
[58] Field of Search ........................... 48/92, 198.2

[56] References Cited

U.S. PATENT DOCUMENTS

| | | | |
|---|---|---|---|
| 1,803,221 | 4/1931 | Tyrer . | |
| 4,062,657 | 12/1977 | Knuppel et al. | 48/92 |
| 4,187,672 | 2/1980 | Rasor | 48/92 |
| 4,244,180 | 1/1981 | Rasor | 48/197 R |
| 5,435,814 | 7/1995 | Miller et al. | 48/92 |
| 5,577,346 | 11/1996 | Malone | 48/198.2 |
| 5,645,615 | 7/1997 | Malone et al. | 48/92 |

*Primary Examiner*—Timothy McMahon
*Attorney, Agent, or Firm*—Laurence P. Hobbes; Richard D. Stone

[57] ABSTRACT

A process in which a high-purity, high-pressure hydrogen-rich gas stream and a high-purity, high-pressure carbon monoxide-rich gas stream are simultaneously produced separately and continuously using a molten metal gasifier that contains at least two zones, thereby avoiding the need to separate or compress the gases in down-stream equipment. In one version of the process, the steps comprise (a) introducing a hydrocarbon feed into a molten metal bath beneath the molten metal surface in a feed zone operating at a pressure above 5 atmospheres absolute, and decomposing the hydrocarbon feed into hydrogen, which leaves the feed zone as a hydrogen-rich gas, and into carbon, which dissolves in the molten metal and increases the carbon concentration, but controlling the carbon concentration to at or below the limit of solubility of carbon in the molten metal, (b) transferring a portion of the molten metal from the feed zone to another molten metal oxidation zone operating at a pressure above 5 atmospheres absolute into which an oxygen-containing material is introduced beneath the molten metal surface to react with a portion of the carbon to form a carbon monoxide-rich gas which leaves the oxidation zone, wherein the carbon concentration in the molten metal is controlled so that it does not reach the concentration at which the equilibrium oxygen concentration would exceed its solubility limit in the molten metal and a separate iron oxide phase would accumulate, (c) transferring at least a portion of the molten metal which has a lower carbon concentration from the oxidation zone back to the feed zone, and (d) passing said separate high-pressure, high-purity hydrogen-rich and carbon monoxide-rich gas streams out of their respective zones, removing entrained dust and cooling the gas streams to temperatures suitable for use in industrial processes.

15 Claims, 4 Drawing Sheets

MOLTEN METAL HYDROCARBON GASIFICATION PROCESS

CROSS REFERENCE TO RELATED APPLICATIONS

This application claims the benefit of 35USC§119(e) of Provisional applications U.S. Ser. No. 60/018,745, filed May 31, 1996 (docket number 6501MUS) and U.S. Ser. No. 60/018,890 filed May 31, 1996 (docket number 6431PUS. Data on dust removal is disclosed in U.S. patent application Ser. No. 08/585,991, filed Jan. 12, 1996, (docket number 6524AUS).

BACKGROUND OF THE INVENTION

1. Field of the Invention

The present invention relates to the general field of molten metal baths for the gasification of materials containing hydrogen and carbon.

2. Discussion of the Prior Art

There is a large and growing market for high-pressure, high-purity hydrogen gas and carbon monoxide gas in oil refining, petrochemical and other industrial markets worldwide. The conventional means for the production of these gases are steam-methane catalytic reforming and vapor-phase gasification of hydrocarbons. While not widely practiced, some inventors have described the use of molten metal reactors utilizing a single reaction zone, such as U.S. Pat. Nos. 4,496,369, 4,511,372, 4,574,714 and 4,602,574, to gasify hydrocarbons. By operating in a single reaction zone, all of the above-mentioned gasifiers produce a single mixed-gas product in which the hydrogen and carbon monoxide are combined. If the objective is to produce a hydrogen-rich gas, then it is necessary to add expensive downstream equipment to remove the carbon monoxide or to convert it to hydrogen (through a water-gas shift reaction). Alternatively, if the objective is to produce a carbon monoxide-rich gas, then the hydrogen must be removed by expensive downstream methods.

Some inventors have described the use of molten metal gasifiers which use two or more reaction zones, such that a hydrogen-rich gas can be produced in a first zone and carbon, which dissolves in the molten iron, is removed by reaction with oxygen in a second (or later) zone. Rasor (in U.S. Pat. Nos. 4,187,672 and 4,244,180) describes a hydrocarbon gasification process in which solid hydrocarbons such as coal are lowered onto the surface of a molten iron bath zone in which high temperature cracking of the hydrocarbons into lighter molecular weight materials takes place and residual carbon is dissolved in the molten iron. The gaseous cracked hydrocarbon products are removed via outlets in the shaft through which the feed hydrocarbon solids drops onto the molten iron. The molten iron containing dissolved carbon is transferred to a second molten iron zone in which an oxygen-containing gas is introduced to convert the carbon into carbon monoxide and raise the temperature of the iron for transfer back to the feed zone. The carbon monoxide is further oxidized above the molten iron bath and heat is recovered via a boiler or similar system. Sulfur in the feed is removed via slag formation on top of the molten iron. This process, while able to produce a hydrogen-rich gas separate from the oxidization gases, produces a relatively low-purity hydrogen-rich gas due primarily to the presence of lighter hydrocarbons which result from the cracking of the solid feed. Furthermore, no attempt is made to produce a high-purity carbon monoxide gas product.

Tyrer (in U.S. Pat. No. 1,803,221) and Nixon (in U.K. Patent 1,187,782) describe in general terms two-zone gasifier processes that have the potential to produce a high-purity hydrogen-rich gas by introducing the hydrocarbon feed below the surface of the molten iron, thereby minimizing the production of cracked products. However, by operating at atmospheric pressure, these molten-metal gasifier processes produce hydrogen-rich and carbon monoxide-rich gases at atmospheric pressure, when in fact most industrial processes require that such gases be available at higher pressures, such as 5 to 100 atmospheres absolute or higher. Thus, when using such processes, it is necessary to compress the gases prior to industrial use, which is very expensive.

SUMMARY OF THE INVENTION

The present invention broadly comprises a process in which a high-purity, high-pressure hydrogen-rich gas stream and a high-purity, high-pressure carbon monoxide-rich gas stream are simultaneously produced separately and continuously from a molten metal gasifier that contains at least two zones. The need to separate or compress the gases in down-stream equipment is thereby avoided. In one version of the process, the steps comprise (a) introducing a hydrocarbon feed into a molten metal zone (the "feed zone") operating at a pressure above 5 atmospheres absolute beneath the molten metal surface and decomposing the hydrocarbon feed into hydrogen, which leaves the feed zone as a hydrogen-rich gas, and into carbon, which dissolves in the molten metal and increases the carbon concentration, but never allowing the carbon concentration to exceeds its solubility limit in the molten metal, (b) transferring a portion of the molten metal containing a higher concentration of carbon from the feed zone to another molten metal zone (the "oxidation zone") operating at a pressure above 5 atmospheres absolute into which an oxygen-containing material is introduced beneath the molten metal surface and which reacts with a portion of the carbon to form a carbon monoxide-rich gas which leaves the oxidation zone, wherein the carbon concentration in the molten metal is controlled so that it does not reach the concentration at which the equilibrium oxygen concentration would exceed its solubility limit in the molten metal and a separate iron oxide phase would accumulate, (c) transferring at least a portion of the molten metal which has a lower carbon concentration from the oxidation zone back to the feed zone and (d) passing the separate high-pressure, high-purity hydrogen-rich and carbon monoxide-rich gas streams out of their respective zones, removing entrained dust and cooling the gas streams to temperatures suitable for use in industrial processes.

In another embodiment of the process of the invention, sulfur from the hydrocarbon feed can be allowed to build up to equilibrium levels in the molten metal bath and react to form hydrogen sulfide and other volatile sulfur compounds which can leave the feed zone and oxidation zone in the separate hydrogen-rich and carbon monoxide-rich gases and be removed from the gases at high pressure by conventional means such as amine scrubbing, caustic scrubbing, etc. and the separate low-sulfur product gases can leave the process for use in other industrial processes.

Another variation of the apparatus of the invention can incorporate a single gas-impermeable vessel in which baffles are used to separate the molten metal bath into two zones and to form a draft tube or chimney-effect near the center of the molten metal bath to promote circulation of molten metal between the two zones.

Another variation of the process can use hydrocarbon feed and gas product valving systems operating in a timed sequence to subject the molten metal successively to a feed mode and an oxidation mode in a single vessel, rather than actually circulating the metal between vessels or zones.

Still another variation of the process can use a portion of the liquid hydrocarbon feed prior to its introduction to the feed zone as a scrubbing medium to remove entrained dust from the hydrogen-rich and carbon monoxide-rich product gases. The liquid hydrocarbon feed containing removed dust may be passed through a magnetic separation device to preferentially separate out a portion of the low-iron dust from the hydrocarbon feed before it is fed to the molten metal feed zone.

BRIEF DESCRIPTION OF THE DRAWINGS

FIG. 2b is a detailed drawing of the baffle arrangement of FIG. 2a.

DETAILED DESCRIPTION OF THE INVENTION

Figure 1:
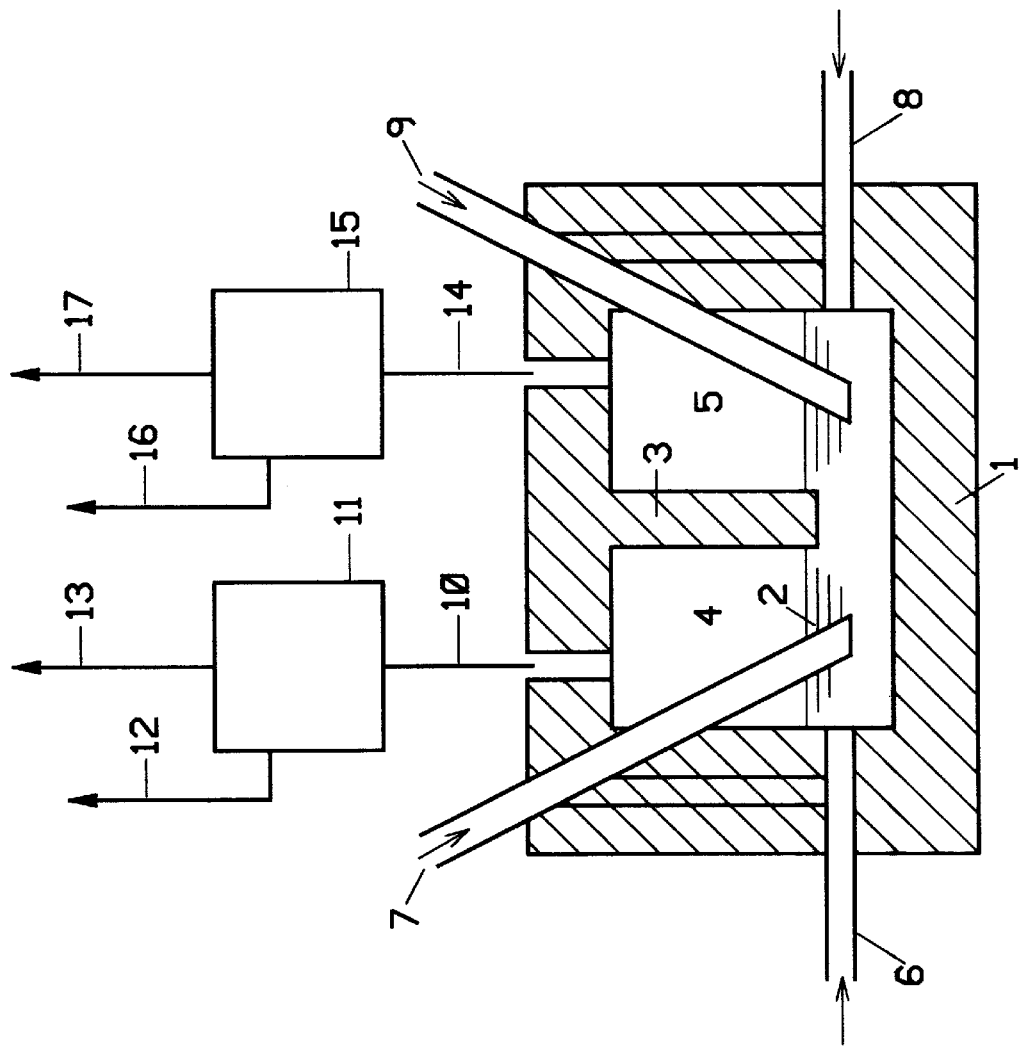
FIG. 1 is a schematic drawing of the basic apparatus and process of this invention.

The invention provides process and apparatus for producing simultaneously a high-purity, high-pressure hydrogen-rich gas stream and a high-purity, high-pressure carbon monoxide-rich gas stream separately and continuously using a molten metal gasifier that contains at least two zones, a "feed zone" and an "oxidation zone", (or in a saving embodiment, a feed mode and an oxidization mode) together with necessary ancillary equipment. Each zone (mode) preferably operates at a pressure above 5 atmospheres absolute and contains a bath of comprising molten iron and, possibly, other molten metals, such as copper, zinc, chromium, manganese, nickel or other meltable metal in which carbon is soluble. Preferably the bath contains at least 30 percent iron by weight. Depending upon the feed, the bath may also contain slag components which, if present, preferably form a separate phase.

In the feed zone, a hydrocarbon-containing feed in the form of a gas, liquid, solid or mixed phase, e.g., a solid-liquid slurry or atomized solid or liquid is introduced below the surface of the molten metal bath so that the hydrocarbon feed comes into intimate contact with the molten metal. The feed is introduced beneath the surface of the molten metal by a submerged tuyere or lance or by high-velocity injection from a lance above the bath, thereby ensuring that substantially complete chemical reactions and substantially complete conversions to hydrogen and carbon are achieved. It has been shown that high-purity hydrogen, defined as having a composition very close to thermodynamic equilibrium, can be obtained in this manner. The high-purity hydrogen thus formed leaves the feed zone as a high-pressure hydrogen-rich gas, while the carbon dissolves in the molten metal. Any nitrogen compounds present in the hydrocarbon feed will decompose to form molecular nitrogen and leave as an impurity in the hydrogen-rich gas. The hydrocarbon feed should contain a minimum of moisture and other oxygen-containing compounds since these compounds will decompose to form oxygen, which in turn will react with dissolved carbon to form carbon monoxide, an undesirable impurity in the hydrogen-rich gas.

The molten metal from the feed zone containing higher levels of dissolved carbon then enters the oxidation zone where oxygen, air, oxygen-enriched air or other suitable oxygen-bearing stream is introduced. The oxygen-bearing stream is introduced beneath the surface of the molten metal by a submerged tuyere or lance or by high-velocity injection from a lance from above the bath. A portion of the dissolved carbon reacts with the oxygen to form carbon monoxide. It has been shown that high-purity carbon monoxide, defined as having a composition very close to thermodynamic equilibrium, can be obtained in this manner. The high-purity carbon monoxide thus formed leaves the oxidation zone as a high-pressure carbon monoxide-rich gas separate from the hydrogen-rich gas produced in the feed zone. The molten metal from the oxidation zone which has a lower concentration of carbon re-enters the feed zone where the carbon level is increased again.

Both molten metal zones are operated at elevated pressures, preferably between 5 and 100 atmospheres absolute, which results in the production of the hydrogen-rich and carbon monoxide-rich gases at elevated pressures, thereby eliminating the need for costly compression of the gases to industrial operating pressures, as mentioned earlier. By reducing gas hourly space velocity (GHSV), elevated pressures also result in smaller equipment and piping for the process including all downstream equipment and in reduced dust carryover from the feed and oxidation zones and, by Stoke's Law, elevated pressures reduce deleterious dust carry-over or "fuming".

A significant portion of the oxygen left in the molten iron as it re-enters the feed zone will react with carbon from the hydrocarbon feed to form carbon monoxide, which then becomes an impurity in the hydrogen-rich gas stream. Thus, it is important to operate the process in such a manner that there is a minimum of oxygen present in the molten iron when it re-enters the feed zone. As a minimum, the molten metal will contain dissolved oxygen based on the equilibrium with carbon monoxide gas. In addition, as an oxygen-rich stream is introduced into molten metal, there is a tendency for the oxygen solubility limit of the molten metal to be exceeded immediately at the interface between the oxygen-rich stream and the molten metal, which results in the formation of a separate iron oxide phase at the interface. This iron oxide phase will be readily dissolved by surrounding molten metal and not accumulate in the molten metal bath provided the overall oxygen concentration of the molten metal bath is below the oxygen solubility limit. If the overall equilibrium oxygen concentration of the molten metal bath exceeds the solubility limit, however, the separate iron oxide phase will tend to accumulate to significant levels. Then, when the molten metal containing significant quantities of this iron oxide phase re-enters the feed zone, much of this iron oxide phase will react with carbon from the hydrocarbon feed to form a substantial quantity of carbon monoxide, which will contaminate the hydrogen-rich gas being produced. Accumulation of significant quantities of a separate iron oxide phase also substantially increases the attack of the refractory walls in the vessels holding the molten metal since a separate iron oxide phase can be very aggressive toward refractory. Thus, the oxygen concentration in the molten metal must be controlled so that it does not exceed its solubility limit.

When molten iron is in equilibrium with carbon monoxide gas (formed in the oxidation zone), it has been shown that carbon and oxygen exist in the molten iron at equilibrium concentrations which can be determined by the equation:

$$K = \frac{[C][O]}{P_{CO}} = \frac{-1186}{T} - 2.07 \quad (1)$$

where:
K is an equilibrium constant that varies with temperature, dimensionless
[C] is the concentration of carbon in molten iron, weight percent
[O] is the concentration of oxygen in molten iron, weight percent
$P_{CO}$ is the partial pressure of carbon monoxide, atmospheres absolute (ata)
T is the temperature, °K.

The solubility limit of oxygen in molten iron can be described by:

$$\log[O_{solubility\ limit}] = -6320/T + 2.734 \quad (2)$$

where:
[$O_{solubility\ limit}$] is the concentration of oxygen in molten iron at its solubility limit, weight percent Thus, at a given temperature, T, the minimum concentration of carbon required in the molten iron to ensure that the equilibrium oxygen concentration in the molten iron does not exceed the oxygen solubility limit can be described by the equation:

$$[C] = \frac{K \cdot P_{CO}}{[O_{solubility\ limit}]} \quad (3)$$

At 1600° C., for example, the solubility limit of oxygen based on Equation (2) is 0.229 weight percent in molten iron. Using Equation (3) at this temperature, the minimum carbon concentrations as a function of pressure required to prevent the equilibrium oxygen concentration from exceeding 0.229 weight percent are calculated as follows:

| CO Partial Pressure, ata | Min. Carbon Conc., wt % |
|---|---|
| 0.01 | 0.00009 |
| 0.1 | 0.00088 |
| 1 | 0.00884 |
| 5 | 0.04422 |
| 10 | 0.08844 |
| 20 | 0.17688 |
| 50 | 0.44221 |
| 70 | 0.61910 |
| 100 | 0.88443 |
| 150 | 1.32665 |

Similar relationships can be determined for different temperatures and for molten metal baths which contain iron mixed with other metals.

In commercial steel-making practices, it is common to operate at a pressure of one atmosphere and, in a few processes, under vacuum. As shown by data above, when operating at carbon monoxide partial pressures of one atmosphere or below, relatively low concentrations of carbon can be achieved without reaching the oxygen solubility limit. For example, at 1600° C. and one atmosphere, the carbon concentration must fall below 0.0088 weight percent before the solubility limit of oxygen is exceeded and a separate iron oxide phase starts to accumulate.

When operating at elevated pressures, on the other hand, control of minimum carbon levels becomes much more critical. At 1600° C. and 100 atmospheres of pressure, for instance, the oxygen solubility limit is reached when the carbon level reaches about 0.88 weight percent, which is 100 times higher than for one atmosphere of pressure.

Thus, in the present invention, the carbon concentration in the molten iron leaving the oxidation zone and entering the feed zone is controlled above the value determined by Equation (3) at elevated pressures to prevent the equilibrium oxygen level from exceeding its solubility limit and causing the accumulation of a separate iron oxide phase, which would result in the excessive formation of carbon monoxide in the feed zone and excessive contamination of the hydrogen-rich gas.

The carbon concentration in the molten metal bath leaving the feed zone, on the other hand, is controlled at a higher concentration in order to minimize the quantity and circulation rate of molten metal required in the system. The economics of the process are better when the differential in the carbon concentrations between the feed zone and the oxidation zone are higher. Thus, the carbon concentration in the molten metal leaving the feed zone should be maximized, although the concentration must be kept below the carbon solubility limit (which is in the range of 4–5 weight percent in molten iron) in order to minimize unreacted carbon and hydrocarbon feed from leaving the molten metal as dust and lower molecular weight hydrocarbons in the effluent gas.

This invention also includes having the hydrogen-rich and carbon monoxide-rich gases flow from the molten metal zones through separate product gas lines and pass through successive downstream coolers and dust removal systems to prepare the gases for use by industrial processes.

Suitable feeds for the process include hydrogen- and carbon-containing materials selected from the group consisting of: light gaseous hydrocarbons such as methane, ethane, propane, butane, natural gas, and refinery gas; heavier liquid hydrocarbons such as naphtha, kerosene, asphalt, hydrocarbon residua produced by distillation or other treatment of crude oil, fuel oil, cycle oil, slurry oil, gas oil, heavy crude oil, pitch, coal tars, coal distillates, natural tar, crude bottoms, and used crankcase oil; solid hydrogen- and carbon-containing materials, such as coke, coal, rubber, tar sand, oil shale, and hydrocarbon polymers; and mixtures of the foregoing.

A portion of the hydrogen-rich gas or carbon monoxide-rich gas may be recycled in the process to facilitate feeding hydrocarbons to the feed zone or feeding an oxygen source to the oxidation zone or to promote mixing or movement of the molten metal.

When feeding a heavier liquid or solid hydrocarbon to the feed zone and feeding oxygen to the oxidation zone, the overall process of converting the feedstock to hydrogen-rich and carbon monoxide-rich gases is exothermic. Thus, it becomes necessary to moderate the temperatures of the process. In the present invention, this is accomplished by (a) adding light gaseous hydrocarbons to the feed zone, (b) adding carbon dioxide to the oxidation zone, (c) adding steam to the oxidation zone or (d) diluting the oxygen with air. In each case, sufficient material is added to achieve an overall adiabatic operation and stable operating temperatures. Case (a) or (b) is preferred when the objective is produce two high-purity gas products. Case (c) or (d)

introduces impurities to the carbon monoxide-rich gas and is practical only if the purity of the carbon monoxide-rich gas is not critical.

When a hydrocarbon feed containing sulfur compounds is fed to the feed zone, the sulfur compounds will decompose and elemental sulfur thus formed will dissolve in the molten metal. In conventional practice, a fluxing agent, such as calcium oxide, is added to the bath to react with the dissolved sulfur and produce a sulfide, which forms a slag phase which tends to float on the top of the molten metal. The slag is removed continuously or intermittently by tilting the vessel and pouring out the slag or by allowing the slag to flow through a tap hole in the side of the vessel. Pouring or tapping slag is difficult to practice in a vessel operating at elevated pressures. To handle sulfur in hydrocarbon feeds containing high levels of sulfur of up to 4 weight percent or more requires the use of large amounts of fluxing agents and produces large amounts of slag which must be disposed of safely. Thus, it is becomes very expensive to handle hydrocarbon feeds containing high levels of sulfur using conventional practices.

As an added feature of the present invention, the sulfur in the hydrocarbon feed is processed without the use of slag. Dissolved elemental sulfur (from the hydrocarbon feed) is allowed to build up in the molten metal bath to an equilibrium level and to react with hydrogen dissolved in the bath (also from the hydrocarbon feed). Hydrogen sulfide is formed and leaves the molten metal bath in the gaseous effluents, primarily the hydrogen-rich gas. The concentration of elemental sulfur dissolved in the molten metal bath will reach an equilibrium level such that the rate of sulfur leaving the molten metal bath as hydrogen sulfide is equal to the rate of sulfur entering the molten metal bath with the feed. The equilibrium concentration of sulfur in the molten metal is a function of the carbon level present. By achieving a relatively high level of carbon in the molten metal leaving the feed zone, the equilibrium level of sulfur in the bath can be minimized. Sulfur compounds other than hydrogen sulfide, such as carbonyl sulfide and carbon disulfide, may also be formed and leave in the products gases, especially in the carbon monoxide-rich gas. The product gases may be fed to conventional scrubbers to remove the hydrogen sulfide and other gaseous sulfur compounds, thereby recovering the sulfur for reuse in industry and producing substantially sulfur-free product gases.

As another added feature of the present invention, a portion of the liquid hydrocarbon feed, prior to its introduction to the molten metal feed zone, may be used as a scrubbing medium to remove dust from the hydrogen-rich and carbon monoxide-rich gases (6524AUS). The portion of the hydrocarbon feed containing the removed dust is then joined with the remainder of the hydrocarbon feed and introduced to the feed zone, thereby providing a direct and inexpensive means of recovering and recycling the dust back to the molten metal bath.

As still another added feature of the present invention, the liquid hydrocarbon feed containing removed dust may be passed through a magnetic separation device to preferentially separate out a portion of the low-iron dust from the hydrocarbon feed before it is fed to the molten metal feed zone. In this manner, a portion of the non-iron slag compounds which can build up in the molten metal bath over time may be continuously removed from the system.

FIG. 1 illustrates an example of the invention in a simplified diagram of the process. Molten iron 2 is contained in vessel 1. In this example, the molten iron in vessel 1 is maintained at a pressure of about 50 atmospheres absolute and a temperature between 1400 and 1600° C. to keep it substantially liquid. Partition 3 divides the vessel into two zones 4 and 5. A combination of a low-sulfur heavy liquid hydrocarbon and methane are fed through tuyere pipe 6 or lance pipe 7 so that they enter beneath the molten iron surface of zone 4. The ratio of heavy liquid hydrocarbon to methane is adjusted to maintain system temperatures. The hydrocarbon feeds are converted to a hydrogen-rich gas, which has a composition close to thermodynamic equilibrium, and carbon, which dissolves in the molten iron. The hydrogen-rich gas exits zone 4 via pipe 10 and enters a conventional cooling and dust removal system 11. Entrained dust is removed from the gas and leaves the system through line 12. The gas is cooled to about 40–50° C. and leaves the process through line 13 for consumption in an industrial process.

The molten iron in zone 4 is controlled at about 3.5 weight percent dissolved carbon and is transferred to zone 5 using any of a variety of methods known from the prior art. Oxygen is introduced so that it enters below the molten iron surface in zone 5 through tuyere pipe 8 or lance pipe 9. A portion of the carbon in the molten iron reacts with the oxygen to form a carbon monoxide-rich gas which has a composition close to thermodynamic equilibrium, and which exits zone 5 via exit pipe 14 and enters a conventional cooling and dust removal system 15. Entrained dust is removed from the gas and leaves the system through line 16. The gas is cooled to about 40–50° C. and leaves the process through line 17 for consumption in an industrial process.

In the present example, the concentration of carbon in the molten iron in zone 5 is controlled at about 1.0 weight percent, and always above 0.44 weight percent per Equation (3) at 50 atmospheres absolute, to minimize the formation of a separate iron oxide phase. The molten iron with reduced carbon concentration is then returned to zone 4 using a method known from the prior art.

Figure 2:
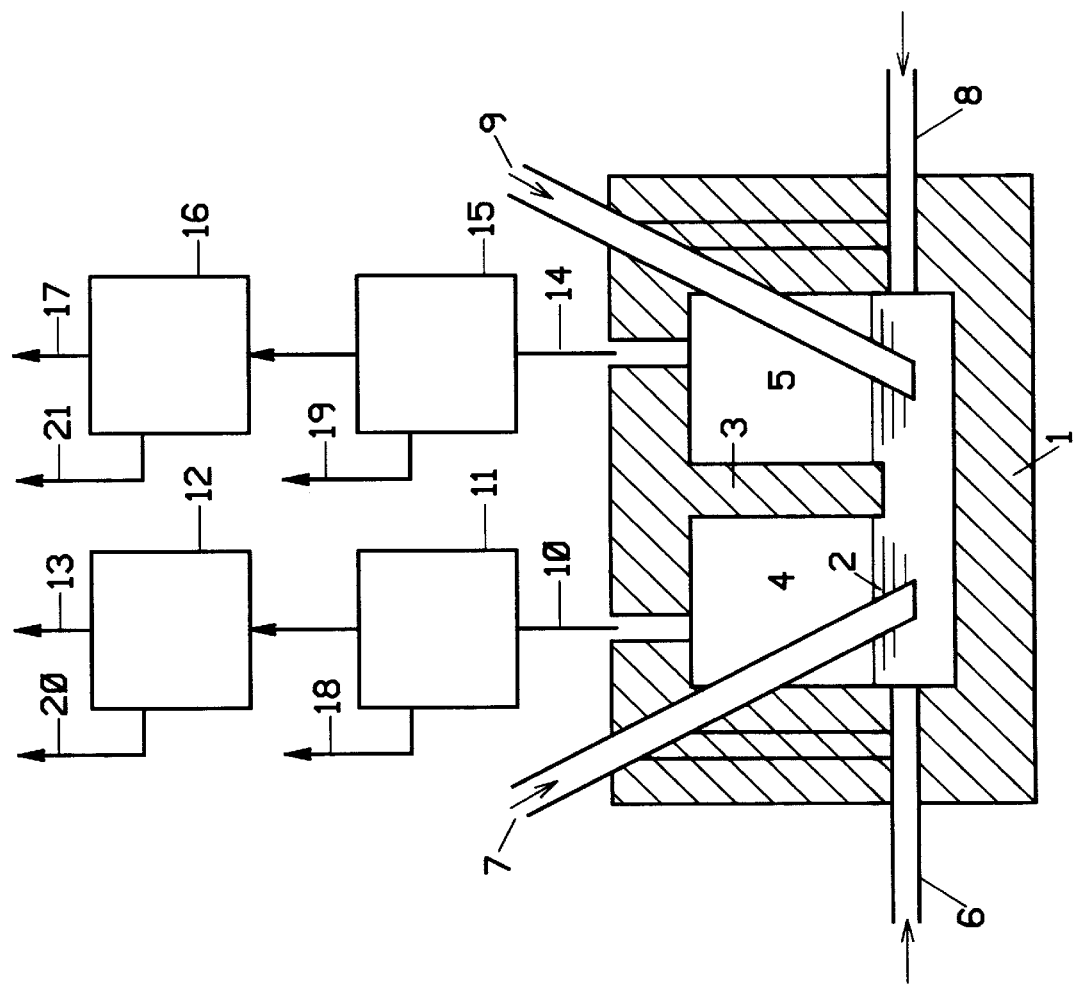
FIG. 2 is a schematic drawing of a variation of the apparatus of the invention incorporating scrubbing systems to remove hydrogen sulfide and other volatile sulfur compounds from the hydrogen-rich and carbon monoxide-rich gases.

FIG. 2 illustrates another example of the invention in a simplified diagram of the process. This example incorporates all the elements of FIG. 1 including the description above except that the heavy liquid hydrocarbon contains a high concentration of sulfur of about 5.5 weight percent. The sulfur in the feed is allowed to build up to equilibrium levels in the molten iron in zones 4 and 5. At equilibrium, the sulfur compounds in the molten iron are converted to hydrogen sulfide and other volatile sulfur compounds in zones 4 and 5 and exit in the hydrogen-rich and carbon monoxide-rich gases via lines 10 and 14. After dust removal and cooling in systems 11 and 15, the sulfur compounds are removed from the gases by conventional means, such as amine scrubbing, caustic scrubbing, or other suitable method in sulfur removal systems 12 and 16. The removed sulfur compounds leave the process through outlet pipes 20 and 21. The gases containing low residual sulfur levels leave the process through outlet pipes 13 and 17.

Figure 2A:
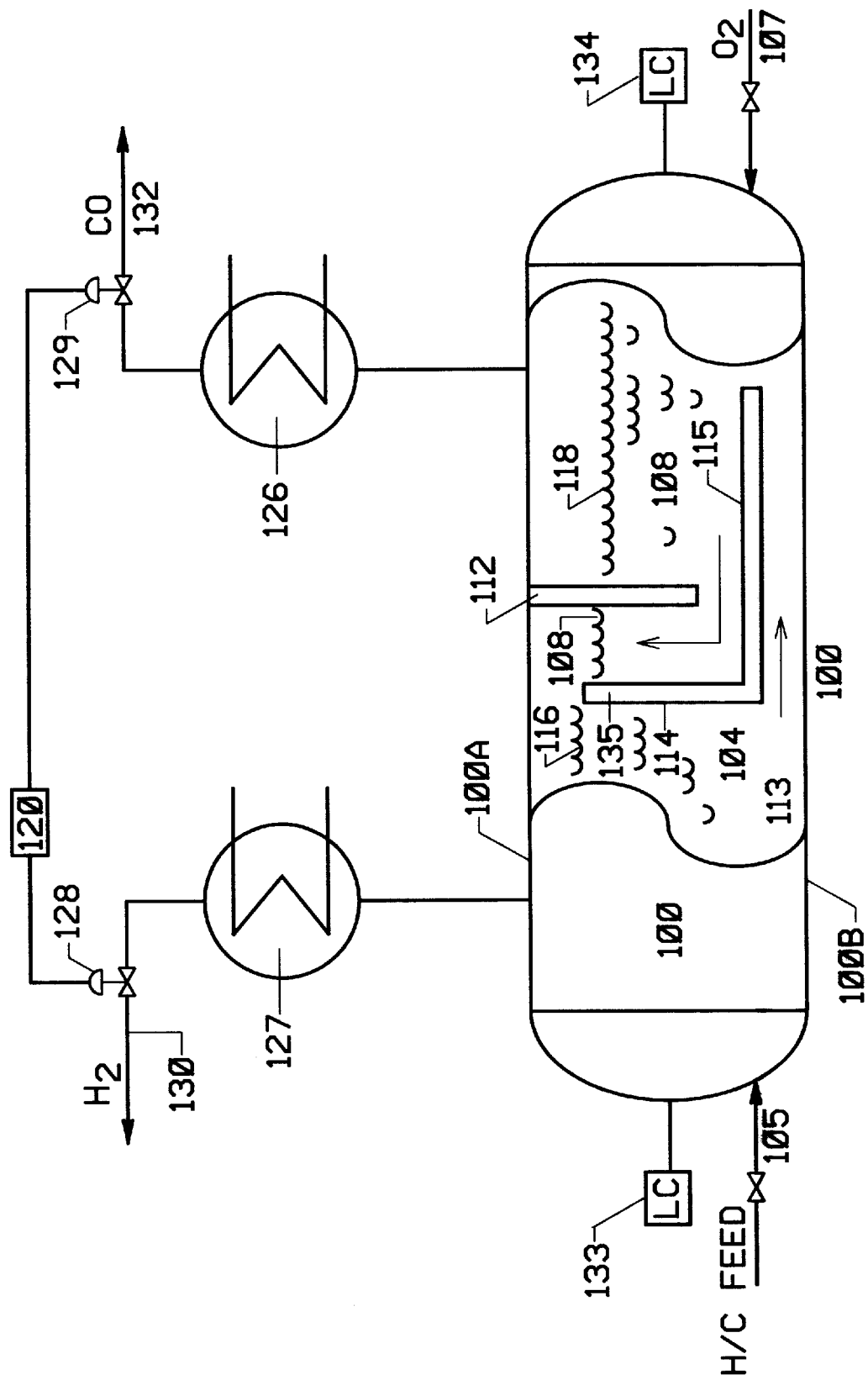
FIG. 2a is a schematic drawing of a variation of the process describing a specific apparatus for carrying out the basic process of the invention.

FIG. 2a illustrates another example of the invention in a simplified diagram of the process in which a novel method for transferring the molten metal from one zone to the other and back is described. Referring to FIG. 2a, the main vessel (a refractory-lined steel vessel 100) encloses and partially defines feed zone 104, oxidizing zone 106, lower circulation zone 113, and L-shaped recycle zone 108. Feed zone 104 receives feed through feed inlet 105. Oxygen enters through oxidizer feed inlet 107 into oxidizing zone 106. Oxidizing zone 106 and recycle zone 108 are controlled by pressure control means 120 which acts on control valve 128 and control valve 129 to throttle hydrogen-rich gas outlet 130 and carbon monoxide-rich gas outlet 132 differentially as desired. Cooler 127 and cooler 126 protect control valve 128 and control valve 129 by cooling the products. Level controller 133 and level controller 134 control the level in the feed and in the oxidizing zone respectively, and feed signals to pressure control means 120 to maintain those levels.

FIG. 2b is a detail of the baffles 135 and 136 in FIG. 2a. Note that baffle 135 has both a horizontal and a vertical projection whereas baffle 136 is primarily vertical in its projection and is sealed hermetically to the edges of refractory-lined steel vessel 100 to effectively separate the gas spaces above the feed zone and the oxidizing zone. [chimney baffle U.S. Pat. No. 5,435,814 (6431BUS)] Together, baffle 135 and baffle 136 define lower circulation zone 113, recycle zone 108, and additionally separate the two gas phases as mentioned above. The recycle zone 108 is particularly formed by a hearth-like substantially horizontal projection of baffle 135 and the vertical upward projection of baffle 135 which acts with baffle 136 to form a chimney-like vertical section to the recycle zone 108. This configuration is an important feature of this variation of the process invention because it provides the necessary circulation which moves molten metal containing dissolved carbon first through lower circulation zone 113 from the feed zone 104 to the oxidizing zone 106, thence through recycle zone 108 after the carbon has been largely removed in the oxidizing zone 106 in closed vessel 100.

In operation, the apparatus of FIG. 2a has a temperature of approximately 1300° C. in feed zone 104 and 1400° C. in oxidizing zone 106, and emits hydrogen-rich gas and carbon monoxide-rich gas at approximately these temperatures, respectively. Feed zone 104 contains about 3 to 4 weight percent carbon dissolved in molten metal and is not allowed to exceed the carbon solubility limit. The carbon content of molten metal in oxidizing zone 106 is an amount less than in feed zone 104 and is determined by the circulation rate of the molten metal, the feed rate of carbon to the feed zone and the oxygen rate to the oxidizing zone, but is not allowed to reach the point where oxygen solubility is exceeded and an iron oxide phase forms. The vessel is a conventional refractory-lined design of steel suitable for the temperature and other surface conditions. The oxygen source is preferably 99.9% oxygen distilled from an oxygen plant operating on air (not shown) but may be air where the additional nitrogen is tolerable.

Figure 3:
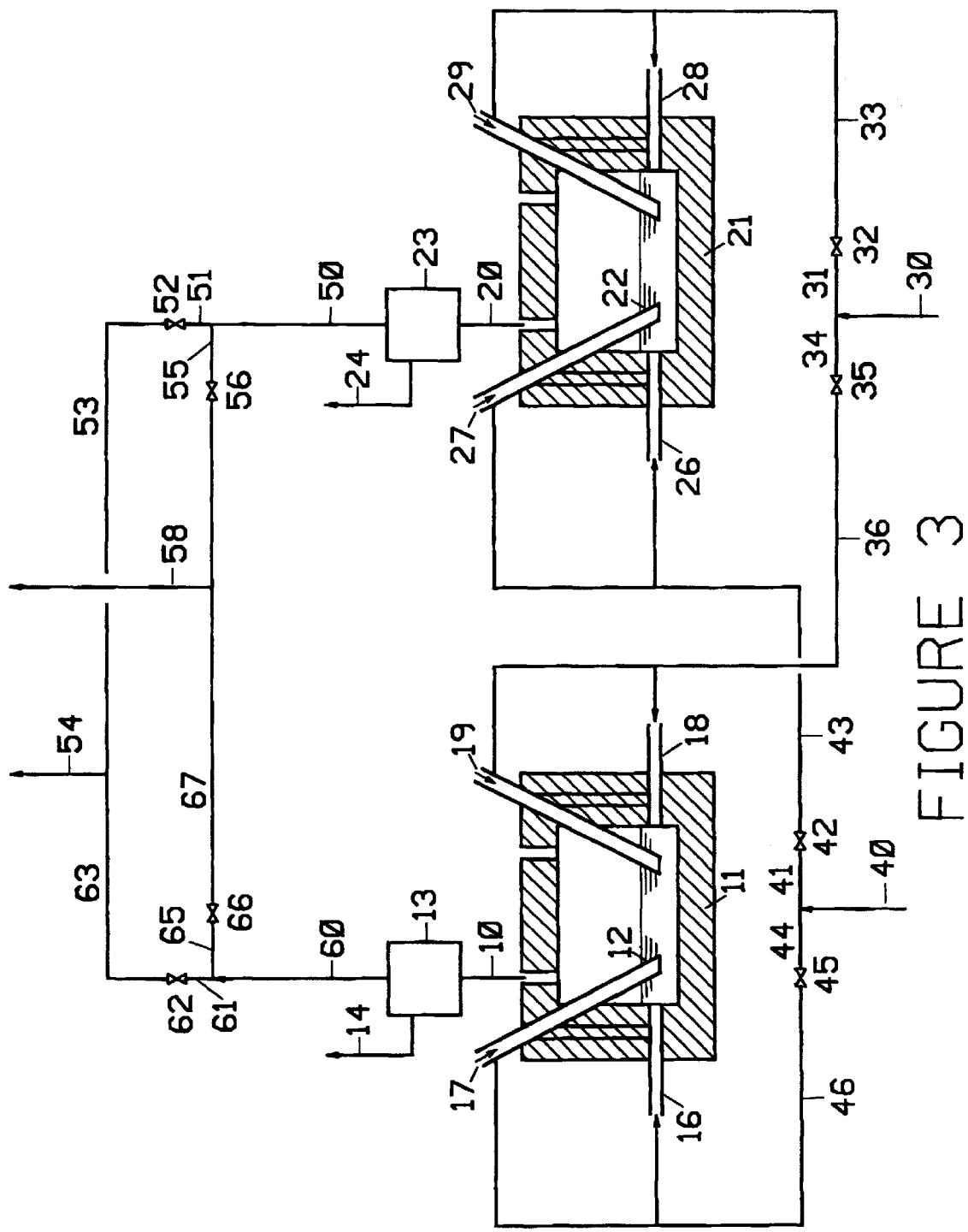
FIG. 3 is a drawing of a variation of the apparatus of the invention incorporating the use of hydrocarbon feed and gas product valving systems operating in a timed sequence to swing the molten metal between a feed mode and an oxidation mode, rather than actually circulating the metal.

FIG. 3 illustrates another example of the invention in a simplified diagram of the process. This example is similar to the example shown in FIG. 1 except that hydrocarbon feed and gas product valving systems operating in a timed sequence are used to simulate the transfer of molten metal between the feed zone and the oxidation zone, rather than actually circulating the metal. In this example, the process comprises two (or more) identical systems performing functions comparable to the system in FIG. 1 and including: vessels 11 and 21 holding molten iron in baths 12 and 22; feed tuyere pipes 16 and 26 and alternative feed lance pipes 17 and 27 for introducing hydrocarbon feeds below the surface of the molten iron 12 and 22; feed tuyere pipes 18 and 28 and alternative feed lance pipes 19 and 29 for introducing oxygen below the surface of the molten iron 12 and 22; vessel exit pipes 10 and 20; gas cooling systems 13 and 23; and product gas pipes 60 and 50.

The system illustrated in FIG. 3 duplicates the two-zone reactor system of FIG. 1 by creating the equivalent of two zones with the use of suitable valves and control systems on the feeds to vessels 11 and 21 and the product gases exiting the cooling systems 13 and 23 via pipes 60 and 50. Thus, the control systems are operated such that while hydrogen-rich gas is being made in vessel 11, carbon monoxide-rich gas is being made in vessel 21. After an appropriate length of time operating in this mode, the feed and product control systems switch the feeds and products and hydrogen-rich gas is made in vessel 21 and carbon monoxide-rich gas is made in vessel 11. The hydrocarbon feed system is described as follows: hydrocarbons are conducted to the system in pipe 40 which divides into pipes 41 and 44; pipe 41 leads to valve 42 and pipe 43 which is connected to tuyere pipe 26 or lance pipe 27 in vessel 21; pipe 44 leads to valve 45 and pipe 46 which is connected to tuyere pipe 16 or lance pipe 17 in vessel 11. The oxygen feed system is described as follows: oxygen is conducted to the system in pipe 30 which divides into pipes 31 and 34; pipe 31 leads to valve 32 and pipe 33 which is connected to tuyere pipe 28 or lance pipe 29 in vessel 21; pipe 34 leads to valve 35 and pipe 36 which is connected to tuyere pipe 18 or lance pipe 19 in vessel 11. The determination of whether hydrocarbons or oxygen are fed to either vessel 11 or 21 is determined by whether valves 32, 35, 42 and 45 are open or shut; these settings, in turn, being established by the control system.

The product gas system from vessel 11 is described as follows: product gases exit vessel 11 via pipe 10, pass through cooling and dust removal system 13 and enter pipe 60; the gases may then go via pipe 61 through valve 62 into pipe 63 and pipe 54 connecting with the commercial processes using hydrogen-rich gas; or the gases may go via pipe 65 through valve 66 into pipe 67 and pipe 58 connecting with the commercial processes using carbon monoxide-rich gas. The product gas system from vessel 21 is described as follows: product gases exit vessel 21 via pipe 20, pass through cooling and dust removal system 23 and enter pipe 50; the gases may then go via pipe 51 through valve 52 into pipe 53 and pipe 54 connecting with the commercial processes using hydrogen-rich gas; or the gases may go via pipe 55 through valve 56 into pipe 57 and pipe 58 connecting with the commercial processes using carbon monoxide-rich gas. The routing of each gas is determined by whether valves 62, 66, 52 and 56 are open or shut; these settings, in turn, being established by the control system. At one point in time, for instance, if hydrogen-rich gas is being produced in vessel 11 and carbon monoxide-rich gas is being produced in vessel 21, then valves 45, 32, 62 and 56 will be open and valves 42, 35, 66 and 52 will be closed. At a later time, these valve settings will be reversed when hydrogen-rich gas is being produced in vessel 21 and carbon monoxide-rich gas is being produced in vessel 11.

The system for FIG. 3 has been described in simple terms for the general concept. A more detailed description of the operation of such a swing system is given in U.S. patent application Ser. No. 08/425,938 filed Apr. 19, 1995 (Ashland Docket 6501AUS) which is incorporated herein by reference. This invention may use three molten metal vessels or reactors, instead of two, with similar valving and swing control systems to permit continuous gasification operations when one reactor must be out of service for repairs, etc.

The apparatus of FIG. 3 of the swing system discussed above can be controlled on the basis of elapsed time, mass fed, percent carbon in the molten metal, product purity, or other variables via sensors. The operation of the apparatus of FIGS. 1, 2 and particularly FIG. 3 is similar to that of application Ser. No. 08/425,938 filed Apr. 19, 1995, referred to above and incorporated specifically by reference herein. The present invention is particularly directed in all embodiments to carefully controlling the carbon content of the molten metal. For example, in the embodiments of the invention of FIGS. 1 and 2, the molten metal is circulated from the second zone to the first zone to maintain at least in excess of 0.3 minimum carbon level therein, and more generally 1 to 5%. Controlling carbon helps prevent formation and build-up of FeO in metal, which is important to prevent the formation of CO during $H_2$ production. Without FeO (and related flexing agents) present, one can convert the sulfur to $H_2S$ and scrub it out of the gases with proven amine scrubbing and caustic scrubbing. This alternative eliminates the necessity to go through the difficult step of accumulating the sulfur in a molten metal bath slag and then removing the slag. A substantial percentage of the feed stocks listed above creates little or no slag formation, which simplifies the design of the present invention and improves the economics of operation of the product gas production within specific zones of a single vessel, or alternately within plural reactor vessels.

The present invention permits the creation of a predominately hydrogen stream separate from a carbon monoxide stream, which eliminates the need to go through an expensive water shift reaction to convert carbon monoxide to hydrogen and carbon dioxide, or to perform a bulk separation of carbon monoxide from hydrogen.

The present invention utilizing a system under relatively high pressure from approximately 2 atmospheres to as high as 200 atmospheres has the advantageous result that hydrogen at high pressure is much more valuable than at atmospheric pressure due to the elimination of the high costs of compressing hydrogen. Hydrogen, with its low molecular weight, requires a very high adiabatic head for compression, which translates into many stages of compression with required intercooling, an expensive process. Further, by having the process operate at multiple atmospheres, the result is a higher throughput and less dust carryover. Further, high pressure reactor systems permit the use of smaller pipes and equipment at higher pressure which translates into reduced cost. The present invention additionally envisions the use of a small steam chaser to burn off the little bit of carbon depositing on tuyeres, where tuyeres are employed in lieu of the downwardly directed top mounted lances. Further, it is advantageous to blow CO through the tuyeres when no hydrocarbons are flowing (absent feed).

Additionally, the present invention advantageously employs three or more active reactors, not including a typical standby reactor integrated together in a cycle that minimizes variation and product gas flow rates and compositions. A three system use of three or more active reactors in the manner of application Ser. No. 08/421,102 (Ashland Docket 6391NUS) incorporated above by specific reference, not including the standby reactor and thus integrated together in a cycle, minimizes variations and product gas flow rates in compositions. With three active reactors, one may have one reactor making hydrogen and two reactors making carbon monoxide (in parallel) so that the gas flow through the reactor head spaces and downstream piping is approximately constant as it cycles from H2 to CO. For instance, in a system utilizing SDA pitch as the feed stock and steam for temperature control, the process of the present invention permits making approximately twice as much CO as $H_2$.

Further, by adding a vessel in each of the manifold lines, it is possible to mix the gas coming through the lines and reduce the composition spikes that occur at the beginning and end of each cycle, whether in hydrogen or carbon monoxide production. It is desirable to use small booster compressors to recycle $H_2$ to the oxygen lance and recycle CO to the hydrocarbon feed lances (or tuyeres) to keep them from getting blocked with metal when no product gas flow is passing through the lances (or alternatively the tuyeres). One of the problems which occurs in the multi-zone single hydrogen and carbon gas production systems to which this invention has application, is the recovery and recycling of dust which is going to blow over with the gases into the product lines. The present invention makes advantageous use of SDA pitch feedstock to scrub out the dust as for instance in the embodiment of the invention of FIG. 2. Scrubbing the dust by a liquid feed stock upstream of the lance or tuyere feed into the first zone of two-zone single vessel reactor, or the first reactor in a second reactor alternatively connected to the feed stock manifold eliminates the need to handle the dust as a separate stream. This process aspect advantageously functions to preheat the feed stock and may provide final cool down of the product gases prior to delivery to an end use device. The present invention also functions to eliminate the water knockout drums, stripper and water recycle features of related U.S. application Ser. No. 08/585,991 filed Jan. 12, 1996 referred to above. In this case, the product gases may be cooled with a heat exchanger having non-contact cooling water coils on the outside of the heat exchanger. Further, by use of a diluted hydrocarbon liquid feed to scrub dust from the product gases, one eliminates the need for bag houses employed in the processes of the prior referred application Ser. No. 08/425,938. Advantageously, iron dust which is captured during scrubbing is then recycled to the reactors in the hydrocarbon feed via the lances or alternatively the tuyeres of the illustrated apparatus, FIGS. 1, 2 and 3. As noted above, it is preferred that the feed stock and oxygen are supplied via lances to the zones 4 and 5, respectively, of the single reactor vessel embodiments, FIGS. 1 and 2, or alternatively to the lances of the reactor vessels 11 and 21 of the embodiment of FIG. 3. As mentioned previously, preferably these vessels may be fixed, permitting the use of top mounted downwardly directed lances which eliminates the need for flexible connections required to permit rotation of vessels on trunions. In turn such provides the ability to employ high pressure operation of the reactor or reactors, in turn reducing entrainment and providing higher throughput for unit per unit of volume, with resulting lower capital investment for any given capacity. The high pressure may range from 2 to 200 atm absolute, preferably 5–70 atm; and most preferably 28–35 atm.

Further, whether the carbon feed is via downwardly projection lances which pass through a vapor space above the level of the molten metal or through tuyeres below the carbon surface of the molten metal, does not disassociate from the feed until the contact with the molten metal. Further, the disassociated carbon dissolves into metal. The present invention envisions the use of non-cooled induction heating in maintaining the molten level of the metal bath. By maintaining a minimum dissolved carbon level during the oxidation cycle, oxidation of sulfur in the melt and purging of the sulfur from the melt may be readily effected. By further, deep oxidation, vanadium can be periodically purged from the melt. It is also envisioned that the vessels 1, 11 and 21 of the various embodiments may be cooled exteriorly by spraying coolant on the exterior surface, or circulating cooling water or steam within a jacket about the vessel exterior to further reduce vessel cost.

MODIFICATIONS

One variation of the process is to use an oxygen enriched gas as the source of oxygen through tuyere pipe 8 or lance pipe 9 (FIGS. 1 and 2) for gasifying the dissolved carbon in the molten metal in zone 5.

Another variation of the process is to use liquid feedstocks prior to their introduction to the system via tuyere pipe 6 or lance pipe 7 as a scrubbing medium in the cooling sections 11 and 15 for dust and fume removal from the hydrogen-rich and carbon monoxide-rich product gases exiting vessel 1 through pipes 10 and 14 (FIGS. 1 and 2).

Reference to documents made in the specification is intended to result in such patents or literature being expressly incorporated herein by reference.

What is claimed is:

1. A process for producing simultaneously a high-purity, high-pressure hydrogen-rich gas stream and a high-purity, high-pressure carbon monoxide-rich gas stream separately and continuously using a molten metal gasifier, said process comprising in combination:

a) introducing a hydrocarbon feed into a first molten metal bath comprising iron in a feed zone operating at a pressure above 5 atmospheres absolute beneath the molten metal surface and decomposing the hydrocarbon feed into hydrogen, which leaves the feed zone as a hydrogen-rich gas, and into carbon, which dissolves in the molten metal and increases the carbon concentration, while controlling the carbon concentration at or below the solubility limit of carbon in the molten metal;

b) transferring a first portion of the molten metal containing a higher concentration of carbon from the feed zone to a second molten metal bath in an oxidation zone operating at a pressure above 5 atmospheres absolute into which oxidation zone an oxygen-containing material is introduced beneath the molten metal surface to react with a portion of the carbon to form a carbon monoxide-rich gas which leaves the oxidation zone, while controlling the carbon concentration in the molten metal so that it does not reach the concentration at which the equilibrium oxygen concentration would exceed its solubility limit in the molten metal so as to prevent a separate iron oxide phase accumulating in said oxidation zone;

c) recycling a second portion of the molten metal which has a lower carbon concentration from the oxidation zone back to the feed zone; said second portion having a lower carbon concentration than said first portion, leaving said feed zone;

d) passing said separate high-pressure, high purity hydrogen-rich and carbon monoxide-rich gas streams out of their respective zones, removing entrained dust and cooling the gas streams to temperatures suitable for use in industrial processes.

2. A process as defined in claim 1 in which sulfur from the hydrocarbon feed builds up to equilibrium levels in the molten metal bath and reacts to form hydrogen sulfide and other volatile sulfur compounds which leave the feed zone and oxidation zone in the separate hydrogen-rich and carbon monoxide-rich gases and are removed from the gases at high pressure by conventional means such as amine scrubbing, caustic scrubbing, etc. and the separate low sulfur product gases leave the process for use in other industrial processes.

3. A process as defined in claim 1 comprising providing a single gas-impermeable vessel comprising a feed zone and an oxidation zone; a common molten metal bath extending into each zone; means for introducing hydrocarbon feeds into the feed zone and oxygen-containing material into the oxidation zone, and separation means for physically separating the gas phase of the feed zone from the gas phase of the oxidation zone said separation means comprising:

a) a first baffle mounted vertically within the vessel separating the gas-phase above the feed zone from the product gas phase above the oxidation zone, the first baffle extending substantially gas tight downwardly from the top of the vessel through the gas phase and having a lower edge entering, but not extending, through the common molten metal bath, and thereby defining the feed zone and the oxidizing zone;

b) a part of a second baffle mounted substantially vertically within the vessel and spaced a distance from the first baffle and within the bath, extending up to an upper edge at a level higher than the lower edge of the first baffle and having connected to it, a horizontal baffle extending horizontally from the lower end of the vertical part of the second baffle and extending beyond and below the lower edge of the first baffle such that the horizontal portion of the second baffle defines with the bottom wall of the gas-impermeable vessel a lower circulation zone for the molten metal bath connecting the feed zone with the oxidizing zone; the first baffle and the vertical portion extension of the second baffle defining the feed zone and the oxidation zone; the integral vertical and horizontal portions of the second baffle and the first baffle defining a generally L-shaped recycling zone, in which molten material from the feed zone containing carbon from the feed may circulate under the horizontal portion of the second baffle into the oxidation zone, and wherein the molten bath from the oxidation zone, lowered in carbon after contact with oxygen, may flow in reverse above the horizontal portion of the second baffle and beneath the lower edge of the first baffle and rise vertically between the vertical portion of the second baffle and the first baffle and over the upper edge of the vertical portion of the second baffle in a continuous circulation loop back into the feed zone.

4. The process as defined in claim 1 incorporating the use of hydrocarbon feed and gas product valving systems operating in a timed sequence to simulate the transfer of molten metal between the feed zone and the oxidation zone, rather than actually circulating the metal.

5. The process as defined in claim 1, further comprising providing an oxygen enriched gas as said source of oxygen for gasifying dissolved carbon in the molten metal in the second zone.

6. The process as defined in claim 1, wherein said step of adding a controlled amount of oxygen to said second molten metal zone comprises passing oxygen through a submerged lance entering the molten metal in the second zone through the top surface of the molten metal.

7. The process as defined in claim 1, wherein said hydrocarbon feed comprises a liquid feed stock and said process further comprises scrubbing said hydrogen-rich and carbon monoxide-rich product gas with said liquid feed stock prior to liquid feed stock introduction to the first molten metal zone for dust and fume removal from the hydrogen-rich and carbon monoxide-rich product gases.

8. The process as defined in claim 1, wherein said hydrocarbon feed is a liquid hydrocarbon feed and said process further comprises atomizing the liquid hydrocarbon feed as it is introduced into the first molten metal zone with a hydrogen-rich gas.

9. The process as defined in claim 1, further comprising the step of incorporating a quantity of carbon monoxide-rich gas to cool a tuyere pipe introducing oxygen from below the surface of the molten metal of the second zone.

10. The process as defined in claim 1, further comprising the step of using a quantity of one medium consisting of vapor and steam to cool one of a tuyere pipe and a lance introducing oxygen from above the molten metal in the second zone to thereby moderate the temperature in the second molten metal zone.

11. A process for generating both a hydrogen-rich gas stream and a carbon monoxide-rich gas stream at a pressure in the range of 2 to 200 atmospheres in at least one reactor having first and second separate molten metal zones comprising iron, said process comprising:
  a) introducing into said first molten metal zone operating at 200 to 2000° C. (2192 to 4532° F.)and at 2 to 200 atmospheres a hydrocarbon feed of the group consisting of a relatively dry, less than 1% by weight of water, gas, liquid, solid, or solid-liquid slurry, atomized solid and liquid in a gas beneath the molten metal surface of the first zone in which the hydrocarbon is converted to a hydrogen-rich gas which escapes from the surface of the molten metal, and to carbon which dissolves in the molten metal;
  b) transferring at least a portion of the first molten metal zone to said second molten metal zone; reducing the carbon content of the second molten metal zone by adding a controlled amount of oxygen to oxidize carbon in the second molten metal zone and to produce a carbon monoxide-rich gas stream;
  c) recycling at least a portion of the second molten metal zone back to the first molten metal zone and controlling the amount of carbon in the molten iron which is returned to the first zone from the second zone to be above 0.3 weight percent to minimize formation of a high level of FeO (ferrous oxide) in said first zone;
  d) passing said separate hydrogen-rich gas and carbon monoxide-rich gas streams out of respective first and second zones and cooling said gas streams to temperatures suitable for their introduction into commercial hydrogen-rich gas and carbon monoxide-rich gas consuming processes and controlling the pressure of each gas stream to a level at above 2 atmospheres;
  e) removing sulfur, if any, in the feeds in both zones to provide substantially pure hydrogen-rich and carbon monoxide-rich gas streams going to the commercial gas consuming processes; and
  f) removing dust and fume, if any, generated as part of the process in the molten metal zones generating the hydrogen-rich and carbon monoxide-rich gas streams.

12. The process as defined in claim 11, in which the molten metal employed in this invention is preferably and predominantly molten iron and at least one other molten metal of the group consisting of copper, zinc, chromium, manganese, nickel, and another meltable metal in which carbon is somewhat soluble and which is at least 50% by weight molten iron.

13. The process as defined in claim 12, in which said feed comprises carbonaceous reactant feedstocks selected from the group consisting of: light gaseous hydrocarbons such as methane, ethane, propane, butane, natural gas, and refinery gas; heavier liquid hydrocarbons such as naphtha, kerosene, asphalt, hydrocarbon residua produced by distillation or other treatment of crude oil, fuel oil, cycle oil, slurry oil, gas oil, heavy crude oil, pitch, coal tars, coal distillates, natural tar, crude bottoms, and used crankcase oil; solid hydrocarbon such as coal, rubber, tar sand, oil shale, and hydrocarbon polymers; and mixtures thereof.

14. The process as defined in claim 11 wherein said feed comprises sulfur, allowing the sulfur in the feed to build up to equilibrium levels in the molten metal and converting sulfur to hydrogen sulfide and other volatile sulfur compounds in molten metal for exit with the hydrogen-rich and carbon monoxide-rich gases; and cooling the sulfur compounds and removing the sulfur compounds from said gases by scrubbing, and then passing essentially sulfur-free, hydrogen-rich and carbon monoxide-rich gases to commercial gas consuming processes.

15. The process as defined in claim 11, wherein said at least one reactor comprises two reactors and said process further comprises creating two molten metal zones separated by feed and product control systems, and alternating productions of substantially pure hydrogen-rich and carbon monoxide-rich gas streams in said two molten metal reactors.

* * * * *